United States Patent [19]
Pal

[11] Patent Number: 5,694,349
[45] Date of Patent: Dec. 2, 1997

[54] LOW POWER PARALLEL MULTIPLIER FOR COMPLEX NUMBERS

[75] Inventor: Debajyoti Pal, Fremont, Calif.

[73] Assignee: Amati Communications Corp., San Jose, Calif.

[21] Appl. No.: 624,324

[22] Filed: Mar. 29, 1996

[51] Int. Cl.[6] ........................................ G06F 7/52
[52] U.S. Cl. .............................................. 364/754
[58] Field of Search ............................ 364/754, 760, 364/757, 715.01

[56] References Cited

U.S. PATENT DOCUMENTS

| | | | |
|---|---|---|---|
| 4,858,164 | 8/1989 | Schildhorn | 364/736 |
| 5,262,976 | 11/1993 | Young et al. | 364/760 |
| 5,500,811 | 3/1996 | Corry | 364/724.16 |

OTHER PUBLICATIONS

Weste, Neil H.E., and Eshraghian, Kamran, "Principles of CMOS VLSI Design" pp. 17–19, 542–560, 2nd Edition, Addison–Wesley Publishing, 1993.

*Primary Examiner*—Reba I. Elmore
*Assistant Examiner*—Monica Lewis
*Attorney, Agent, or Firm*—Hickman Beyer & Weaver

[57] ABSTRACT

A high speed, low power parallel multiplier is described. The parallel multiplier includes specialized hardware circuitry designed to perform complex multiplication operations at high speeds. The parallel multiplier requires significantly less die area than conventionally required, which results in reduced manufacturing costs and reduced power consumption.

18 Claims, 3 Drawing Sheets

LOW POWER PARALLEL MULTIPLIER FOR COMPLEX NUMBERS

BACKGROUND OF THE INVENTION

1. Field of the Invention

The present invention relates to multiplier circuits, and more particularly, to low power, high speed parallel multipliers for complex numbers.

2. Description of the Related Art

The multiplication of complex numbers is becoming more often needed. For example, in the telecommunications field, it is not uncommon for modulation techniques and other communication operations to require the multiplication of complex numbers. Further, these modulation techniques and other communication operations normally require that the complex multiplication be completed very rapidly.

Complex numbers include a real part and an imaginary part. For example, for the complex number a+jb, a is the real part and b is the imaginary part.

The multiplication of two complex numbers produces a complex number. The operations necessary to perform the complex multiplication are as follows. To multiply a first complex number, represented as a+jb, and a second complex number, represented as $x_0+jx_1$, requires four multiplication operations and two addition operations. Other non-arithmetic operations for storage and transfer of values are normally required but vary with the circuit or architectural design. The result of the complex multiplication is a complex number, represented as $Y_0+jy_1$. The multiplication of the first and second complex numbers is shown in Equation 1 provided below.

$$(a+jb)(x_0+jx_1)=y_0 jy_1 \quad (1)$$

The variables of the resulting complex number are determined in accordance with Equations 2 and 3 which follow.

$$y_0=ax_0-bx_1 \quad (2)$$

$$y_1=bx_0+ax_1 \quad (3)$$

Note that to produce coefficient $Y_0$ requires two multiplication operations and one addition operation. In this case, the addition operation actually performs a subtraction operation because the number being added ($bx_1$) is placed in a 2's complement representation. Also, to produce coefficient $y_1$ requires two multiplication operations and one addition operation.

Parallel multipliers are multipliers that perform various operations in parallel so that the multiplication result can be determined very rapidly (typically on the order of one clock cycle). Background material on parallel multiplier designs can, for example, be found in Weste and Eshraghian, "Principles of CMOS VLSI Design," 2nd Edition, Addision-Wesley (1992), which is hereby incorporated by reference.

In general, a conventional parallel multiplier for complex numbers designed for high speed parallel operation includes four multipliers and two adders on an integrated circuit chip. With such a parallel design, the conventional multiplier is be able to very rapidly produce the complex result of the multiplication of two complex numbers.

A problem, however, with the conventional parallel multipliers is that they are very costly in terms of die area on an integrated circuit chip. Since die area is a primary cost component of integrated circuit chips, the large mounts of required die area is undesirable. Furthermore, the large mounts of required die area also proportionally increases the power consumption of the integrated circuit chip.

Thus, there is a need for a parallel multiplier that is able perform complex multiplication operations at high speed while minimizing die area and power consumption.

SUMMARY OF THE INVENTION

Broadly speaking, the invention pertains to a high speed, low power multiplier for complex numbers that requires significantly less die area than conventionally required. The multiplier according to the invention includes specialized hardware circuitry (such as multipliers and adders) configured to perform complex multiplication operations at high speeds. Since the multiplier requires significantly less die area than conventionally required, manufacturing costs and power consumption are both reduced.

A multiplier circuit for multiplication of first and second complex numbers, according to an embodiment of the invention includes: a first multiplier for multiplying a fast coefficient with a first variable to produce a first multiplication result; a first adder for adding the first variable with a second variable to produce a first sum; a second multiplier for multiplying a second coefficient with the first sum to produce a second multiplication result; a third multiplier for multiplying a third coefficient with the second variable to produce a third multiplication result; a second adder/subtractor for subtracting the second multiplication result from the first multiplication result to produce a first output; and a third adder for adding the second multiplication result to the third multiplication result to produce a second output. The die area and power savings result from the fact that no additional multipliers beyond said first, second and third multipliers are utilized to achieve the multiplication of the first and second complex numbers. A fourth adder/subtractor may also be included in the multiplier circuit when one of the first, second and third coefficients is not directly supplied to the multiplier circuit. The fourth adder/subtractor then operates in such cases to determine the missing coefficient from the other remaining coefficients that are provided to the multiplier circuit. Also, the multiplier can be operated in a pipelined fashion for increased throughput.

Other aspects and advantages of the invention will become apparent from the following detailed description taken in conjunction with the accompanying drawings, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to a high speed, low power multiplier of complex numbers. The multiplier according to the invention is a parallel multiplier that includes specialized hardware circuitry (such as multipliers and adders) configured to perform complex multiplication operations at high speeds, while requiring significantly less die area than that conventionally required. The reduction in die area beneficially results in reductions in manufacturing costs and power consumption.

The invention yields a reduction in die area because three separate multiplication units must be provided within the parallel multiplier for parallel computation of the multiplication of two complex numbers, whereas conventionally four multiplication units were required. Each multiplication unit is itself a multiplier of two N bit numbers which are well known and readily available. It can be estimated for a representative case that to form a single 22×22 bit multiplication unit requires in the neighborhood of 4,260 gates on a integrated circuit chip. Hence, with this assumption, the advantage provided by invention result in a savings of 4,260. The invention does, however, require an additional adder (or perhaps two) as compared with that conventionally required, but since the area (number of gates) associated with the fabrication an adder is only about 128 gates in comparison to a savings of 4,260 gates. The net saving in gates for a parallel 22×22 bit multiplier of complex numbers is approximately 4132 gates (4,260−128=4,132), which is a considerable saving in die area. The only requirement is that the parallel multiplier be provided with inputs of the necessary coefficients in particular format as is explained in detail below.

Embodiments of the invention are discussed below with reference to FIGS. 1–3. However, those skilled in the art will readily appreciate that the detailed description given herein with respect to these figures is for explanatory purposes as the invention extends beyond these limited embodiments.

Figure 1:
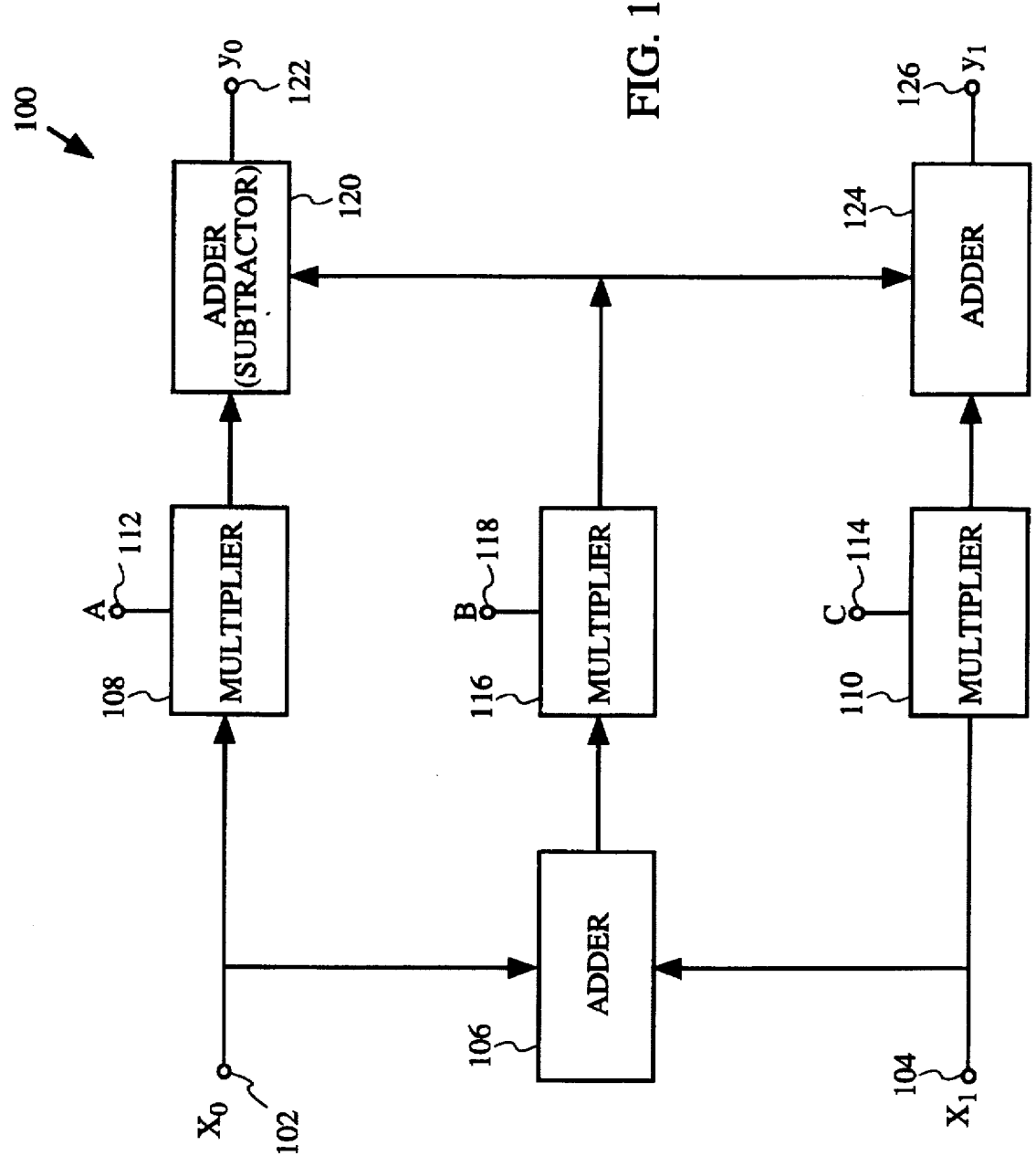
FIG. 1 is a block diagram of a basic embodiment of a parallel multiplier for complex numbers according to a basic embodiment of the invention.

FIG. 1 is a block diagram of a basic embodiment of a parallel multiplier 100 according to the invention. The parallel multiplier 100 receives a first variable $x_0$ at terminal 102 and receives a second variable $x_1$ at terminal 104. The first variable $x_0$ is supplied to an adder 106 and a multiplier at 108. The second variable $x_1$ is supplied to the adder 106 and a multiplier 110.

The adder 106 adds the first variable $x_0$ and the second variable $x_0$ together. The output of the adder 106 is therefore the sum of the first variable $x_0$ and the second variable $x_1$.

The multiplier 108 receives a first coefficient A at terminal 112. The multiplier 108 operates to multiply the first coefficient A with the first variable $x_0$ to produce a first result. The multiplier 110 receives a third coefficient C supplied to terminal 114. The multiplier 110 operates to multiply the third coefficient C with the second variable $x_1$ to produce a second result. A third multiplier 116 operates to receive a second coefficient B supplied to terminal 118. The third multiplier 116 operates to multiply the second coefficient B with the output of the adder 106. The output of the multiplier 116 is a third result.

A subtractor 120 subtracts the third result from the first result to produce a first output $Y_0$ at terminal 122. However, the hardware associated with the subtractor 120 actually adds the 2's complement of the third result to the first result to produce the first output $Y_0$. Hence, the subtractor 120 is also referred to as an adder/subtractor. An adder 124 operates to add the second result to the third result to produce a second output $y_1$ at terminal 126.

Thus, the parallel multiplier 100 implements the multiplication of a first complex number, represented as a+jb, and a second complex number, represented as $x_0+jx_1$, with the result of the complex multiplication being a complex number, represented as $Y_0+jy_1$. The multiplication of the first and second complex numbers by the parallel multiplier 100 according to the invention is performed according to Equation 1 as it must. However, the variables of the resulting complex number are determined as shown in Equations 4 and 5 which follow.

$$y_0 = Ax_0 - B(x_0 + x_1) \quad (4)$$

$$y_1 = Cx_1 + B(x_0 + x_1) \quad (5)$$

Note that to produce variable $Y_0$ requires two multiplication operations and two addition operations (one addition operation actually being a subtraction operation). Also, to produce variable $y_1$ requires two multiplication operations and two addition operations. Note that the later term, namely ($B(x_0 + x_1)$), in both Equations 4 and 5 is the same. It is due to this common term that one of the conventionally required four multipliers can be eliminated from the parallel multiplier according to the invention. In other words, since the value of the later term is shared, only one multiplier is needed to produce the value of the later term. Further, the later term of Equations 4 and 5 does, unlike Equations 2 and 3, require an addition operation. Hence, an additional adder is needed to implement Equations 4 and 5, but the result of the adder can be shared. Note also that it is preferable that at least two of the coefficients A, B and C be directly supplied to the multiplier. Preferably, these coefficients are stored in memory in this fashion and then fed to the multiplier as needed.

Thus, according to the invention, although Equations 4 and 5 indicate that four multiplication operations and four addition operations are required. In effect, the parallel multiplier 100 according to the invention requires only three multipliers and three adders because of the shared terms. Other non-arithmetic operations for storage and transfer of values are normally required but vary with the circuit or architectural design. Thus, in comparison to conventional parallel multipliers which required four distinct multipliers, the invention functions correctly with one less multiplier (and consequently significantly less die area) being required.

The mathematical proof that the parallel multiplier 100 according to the basic embodiment satisfies Equation 1 is as follows.

First, the coefficients A, B and C used in Equations 4 and 5 must be related to the coefficients a, b and c used in Equation 1. Equations 6, 7 and 8 which follow below provide the relationships.

$$A = a + b \quad (6)$$

$$B = b \quad (7)$$

$$C = a - b \quad (8)$$

Second, Equation 4 must be shown to be equivalent to Equation 2. Beginning with Equation 2 and substituting (A−b) for coefficient a and substituting coefficient B for coefficient b, Equation 2 becomes $$y_0 = (A - b)x_0 - Bx_1$$

which simplifies to $$y_0 = Ax_0 - bx_0 - Bx_1$$
$$= Ax_0 - B(x_0 + x_1)$$

and is thus equivalent to Equation 4.

Third, Equation 5 must be shown to be equivalent to Equation 3. Beginning with Equation 3 and substituting (A−b) for coefficient a and substituting coefficient B for coefficient b, Equation 3 becomes $$y_1 = Bx_0 + (A-b)x_1$$

which simplifies to $$y_1 = Bx_0 + ax_1 + Bx_1 - bx_1$$
$$= B(x_0 + x_1) + (a - b)x_1$$
$$= Cx_1 + B(x_0 + x_1)$$

and is thus equivalent to Equation 5.

The above-described mathematical proof therefore establishes that the parallel multiplier according to the invention properly multiplies two complex numbers. Hence, the multiplier for complex numbers according to the invention with its high speed parallel computation design requires less die area and power than conventionally achievable.

Figure 2:
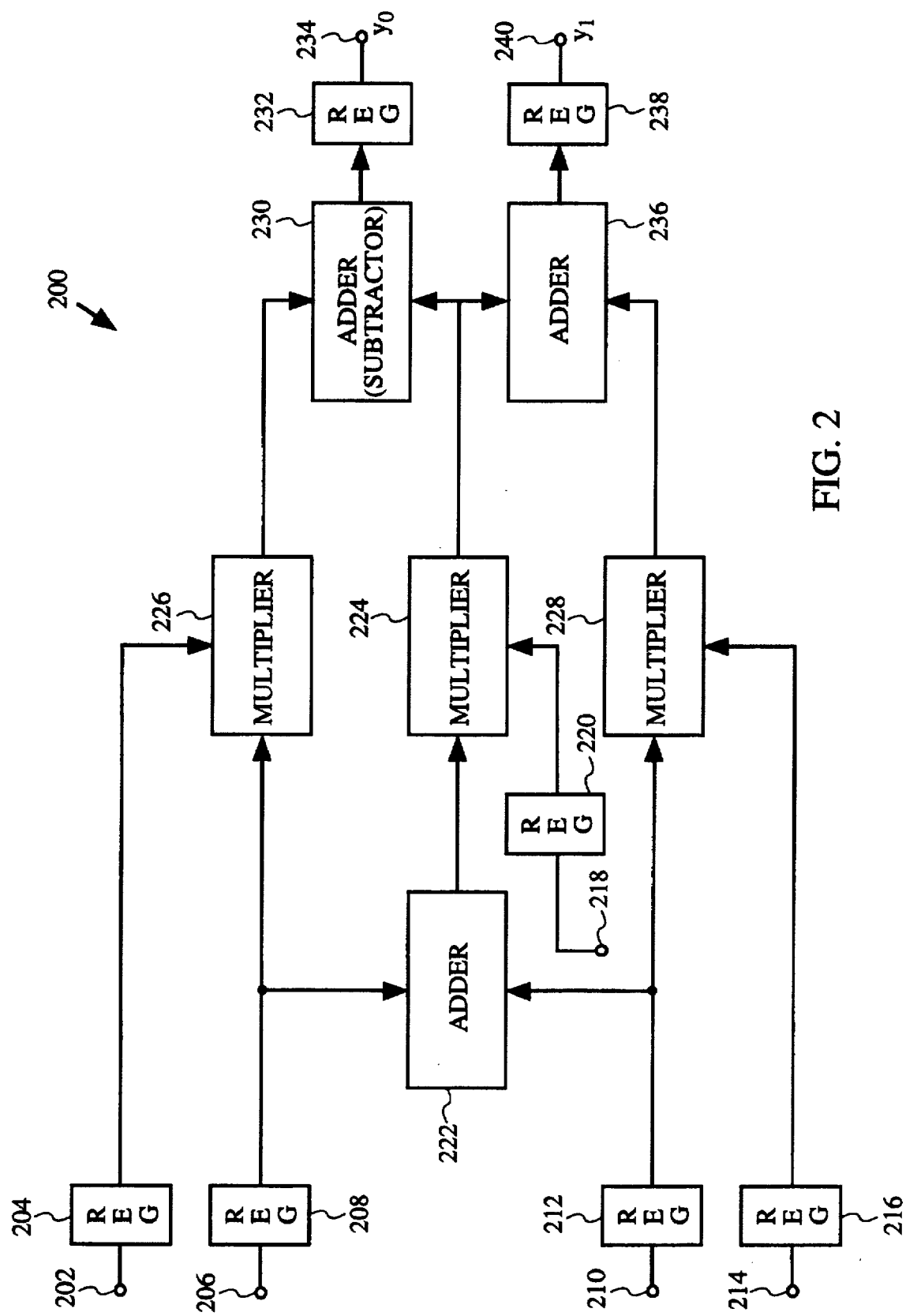
FIG. 2 is a block diagram of a parallel multiplier of complex numbers according to a first embodiment of the invention.

FIG. 2 is a block diagram of a parallel multiplier 200 according to a first embodiment of the invention. The parallel multiplier 200 includes various input and output terminals, registers for temporary data storage, adders for summing values, and multipliers for multiplying values.

A first terminal 202 receives a first coefficient A and stores the first coefficient A in a register 204. A second terminal 206 receives a first variable $x_0$ and stores the first variable $x_0$ in a register 208. A third terminal 210 receives a second variable $x_1$ and stores the second variable $x_1$ in a register 212. A fourth terminal 214 receives a third coefficient C and stores the third coefficient C in a register 216. A fifth terminal 218 receives a second coefficient B and stores the second coefficient B in a register 220.

An adder 222 adds the value stored in register 208 with the value stored in register 212 to produce a result. The result from the adder 222 is supplied to a multiplier 224. The multiplier 224 then multiplies the result from the adder 222 with the value of the second coefficient B stored in the register 220 to produce a multiplication result. A multiplier 226 multiplies the value of the first coefficient A stored in the register 204 with the value of the first variable $x_0$ stored in the register 208 to produce a multiplication result. A multiplier 228 multiplies the value of the second variable $x_1$ stored in the register 212 with the value of the third coefficient C stored in the register 216 to produce a multiplication result.

An adder/subtractor 230 subtracts the result from the multiplier 224 from the result from the multiplier 226. Again, this is preferably implemented using 2's complement addition. The output of the adder/subtractor 230 is stored in a register 232. The output of the register 232 is coupled to a terminal 234 which outputs a first output $Y_0$. An adder 236 adds the result from the multiplier 224 with the result from the multiplier 228. The output of the adder 236 is then stored in a register 238. The output of the register 238 is coupled to a terminal 240 which outputs a second output $y_1$. The first output $Y_0$ is the real part and the second output $y_1$ is the imaginary part of the result of the multiplication of the two complex numbers, namely a+jb and $x_0+jx_1$.

The operation of the parallel multiplier 200 of the first embodiment is substantially the same as the operation of the parallel multiplier 100 of the basic embodiment. The primary difference being that registers 204, 208, 212, 216, 220, 232 and 238 are provided for temporary storage of values. The multiplication of the first s and second complex numbers by the parallel multiplier 200 according to the first embodiment of the invention is performed according to Equation 1, but the variables of the resulting complex number are determined in accordance with Equations 4 and 5. Like the basic embodiment, the parallel multiplier 200 according to the first embodiment of the invention requires only three multipliers and three adders because of the shared terms.

Figure 3:
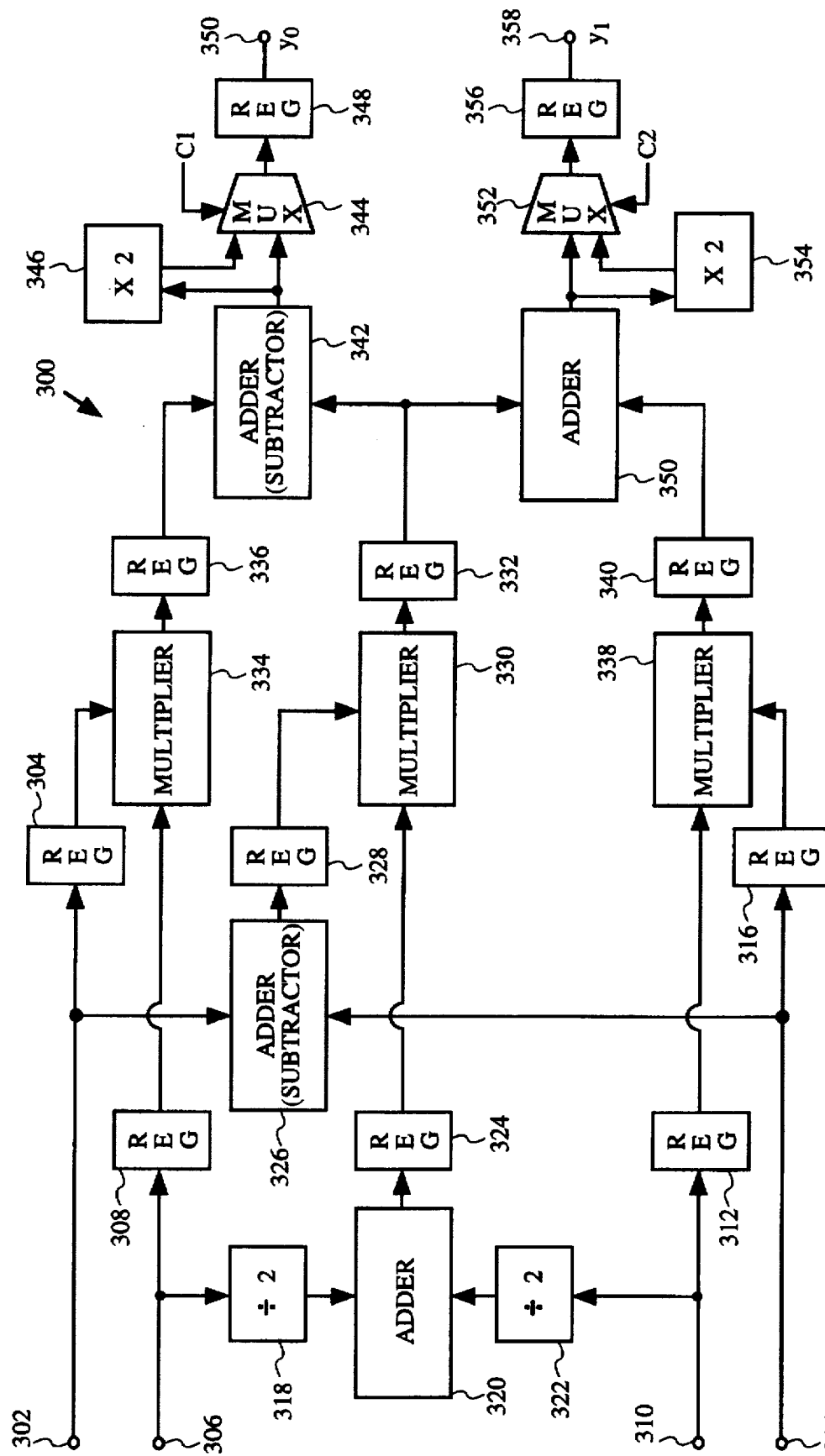
FIG. 3 is a block diagram of a parallel multiplier of complex numbers according to a second embodiment of the invention.

FIG. 3 is a block diagram of a parallel multiplier 300 according to a second embodiment of the invention. This embodiment does not receive the second coefficient B at an input terminal as does the first embodiment, but instead, computes the second coefficient B from the first coefficient A and the third coefficient C which are input to the parallel multiplier 300. In addition, the parallel multiplier 300, unlike the first embodiment shown in FIG. 2, includes additional registers for pipelining operations, and dividers and multipliers implemented as shifters to facilitate scaling operations. The scaling is provided to minimize the likelihood of overflowing the registers which hold various values. The pipelining of values to various portions of the parallel multiplier 300 facilitates faster operation of the parallel multiplier, i.e., in a processor design this means that a faster clock rate can be supported. The scaling and pipelining are discussed in more detail below.

The circuit design/architecture of the parallel multiplier 300 is described as follows. A first coefficient A (scaled down by a factor of 2) is received at terminal 302 and then stored in a register 304. A first variable $x_0$ is received at terminal 306 and then stored in a register 308. A second variable $x_1$ is received at terminal 310 and then stored in a register 312. A third coefficient C (scaled down by a factor of 2) is received at terminal 314 and then stored in a register 316. The first variable $x_0$ is also supplied from the terminal 306 to a divider 318. The divider 318 operates to divide the first variable $x_0$ by 2. Preferably, the division by 2 is achieved by a one-bit shift operation on the binary data for the first variable $x_0$. The result of the divider 318 is supplied to an adder 320. Similarly, the second variable $x_1$ is supplied from the terminal 310 to a divider 322. The divider 322 operates to divide the second variable $x_1$ by 2. The result from the divider 322 is also supplied to the adder 320. The adder 320 then adds the results from the dividers 318 and 322 and stores the results in a register 324.

An adder 326 is also provided in the parallel multiplier 300 to compute a second coefficient B from the first coefficient A and the third coefficient C. In particular, the adder 326 receives the first coefficient A from the terminal 302 and receives the third coefficient C from the terminal 314. The result from the adder 326 is forwarded to a register 328. The adder 326 is actually performing a subtraction operation, namely A−C, which yields B.

A multiplier 330 multiplies together the second coefficient B stored in the register 328 and the result of the adder 320 stored in the register 324. The result from s the multiplier 330 is then stored in a register 332. A multiplier 334 multiplies together the first coefficient A stored in register 304 and the first variable $x_0$ stored in the register 308. The result from the multiplier 334 is then stored in a register 336. A multiplier 338 multiplies together the second variable $x_1$ stored in the register 312 and the third coefficient C stored in the register 316. The result from the multiplier 338 is the stored in a register 340.

An adder/subtractor 342 adds the values contained in the registers 332 and 336. The adder/subtractor 342 is actually subtracting the value in the register 332 from the value in 336 using 2's complement addition. The result from the adder/subtractor 342 is then forwarded to a first input terminal of a multiplexer 344 and a multiplier 346. The multiplier 346 multiplies the received value by a factor of 2 to scale up the result from the adder/subtractor 342. The scaled-up result from the multiplier 346 is forwarded to a second input terminal of the multiplexer 344. The particular one of the first and second inputs to the multiplexer 344 to be output is then selected by a control signal C1 supplied to the multiplexer 344. The selected output of the multiplexer 344 is then stored in a register 348. The output of the register 348 is a first output $Y_0$ from the parallel multiplier 300 and is coupled to a first output terminal 350.

An adder 350 adds the values contained in the registers 332 and 340. The result from the adder 350 is then forwarded to a first input terminal of a multiplexer 352 and a multiplier 354. The multiplier 354 multiplies the received value by a factor of 2 to scale up the result from the adder 350. The scaled-up result from the multiplier 354 is forwarded to a second input terminal of the multiplexer 352. The particular one of the first and second inputs to the multiplexer 352 to be output is then selected by a control signal C2 supplied to the multiplexer 352. The selected output of the multiplexer 352 is then stored in a register 356. The output of the register 356 is a second output $y_1$ from the parallel multiplier 300 and is coupled to a second output terminal 358.

The size (number of bits) of the registers, adders and multipliers of the parallel multiplier 300 will vary widely depending upon implementation. For example, for a preferred 22-bit implementation, the registers 304, 308, 312, 316, 324, 328, 332, 336, 340, 348 and 356 would be 22-bits wide, the adders 320, 326, 342 and 350 would be 23-bits wide, and the multipliers would be 330, 334 and 338 would produce a 44-bit result. In the case of extra bits, the registers would store the most significant 22 bits. The scaling down by the dividers 318 and 322 and the subsequent scaling up by the multipliers 346 and 354 are provided to prevent overflow which should be guarded against, particularly when the values and coefficients utilized are represented in a 2's complement format.

It should be noted that because the parallel multiplier 300 according to the first embodiment includes four adders, whereas the parallel multiplier 200 according to the second embodiment required only three adders. The additional adder (adder 326) is required in the second embodiment because the second coefficient B is not supplied to the parallel multiplier 300. Consequently, the additional adder performs the operation A–C to produce the second coefficient B. Either implementation is possible, but implementations which require the additional adder use more die area. However, since the die area to fabricate an adder is much less than that needed to fabricate a multiplier, even those parallel multipliers according to the invention which require an additional adder result in substantial die area savings over conventional designs.

The multipliers 112–116, 224–228, 330, 334, 338 used in the various embodiments of the parallel multiplier discussed above are preferably 2's complement multipliers. The 2's complement multipliers receive and output numbers in a 2's complement representation. The inputs to the 2's complement multiplier which are negative numbers are converted to positive numbers before they are multiplied as the multiplication operation does not work on numbers in the 2's complement representation. Then, after the positive numbers are multiplied, the sign of the result is determined from the signs of the input data so that the output result carries the correct sign in the 2's complement representation.

The parallel multiplier according to the invention is useful for performing multiplication of complex numbers in stand alone hardware circuitry or for incorporation into the architecture of an integrated circuit or processor chip (such as a Digital Signal Processing (DSP) chip).

In a telecommunications environment, it is not uncommon for modulation techniques and other communications operations to require the multiplication of complex numbers at very high speeds. Thus, it is desirable to have dedicated circuitry or dedicated architectural hardware with an integrated circuit chip (such as a DSP chip) to perform complex multiplications very rapidly (e.g., in a single clock cycle). The multipliers according to the invention discussed above are parallel multipliers which require parallel operations be performed, and are therefore well suited for the telecommunications environment. Often there is a need to perform numerous complex multiplications simultaneously. In such cases, the hardware for a single parallel multiplier is typically replicated in the circuitry or architecture. For example, if a system needs to perform four complex multiplications in a single clock cycle, four isolated parallel multipliers are placed in the design. The invention thus would provide a die area savings of on the order of 16,528 (4×4,132) gates given the assumptions discussed above for a parallel 22×22 bit multiplier.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as failing within the scope of the invention.

What is claimed is:

1. A parallel multiplier circuit for multiplication of fast and second complex numbers, said multiplier circuit comprising:

a first multiplier for multiplying a first coefficient with a first variable to produce a first multiplication result;

a first adder for adding the first variable with a second variable to produce a first sum;

a second multiplier for multiplying a second coefficient with the first sum to produce a second multiplication result;

a third multiplier for multiplying a third coefficient with the second variable to produce a third multiplication result;

a second adder/subtractor for subtracting the second multiplication result from the first multiplication result to produce a first output; and a third adder for adding the second multiplication result to the third multiplication result to produce a second output.

2. A parallel multiplier circuit as recited in claim 1, wherein the multiplication of the first and second complex numbers produces a complex result, and wherein the first output is a real part of the complex result and the second output is an imaginary part of the complex result.

3. A parallel multiplier circuit as recited in claim 1, wherein no additional multipliers beyond said first, second and third multipliers are utilized to achieve the multiplication of the first and second complex numbers.

4. A parallel multiplier circuit as recited in claim 1, wherein the first and third coefficients are supplied to said multiplier circuit and the second coefficient is not supplied to said multiplier circuit, and wherein said multiplier circuit further comprises a fourth adder/subtractor for subtracting the third coefficient from the first coefficient to produce the second coefficient.

5. A parallel multiplier circuit as recited in claim 4, wherein the multiplication of the first and second complex numbers produces a complex result, and wherein the first output is a real part of the complex result and the second output is an imaginary part of the complex result.

6. A parallel multiplier circuit as recited in claim 4, wherein no additional multipliers beyond said first, second and third multipliers are utilized to achieve the multiplication of the first and second complex numbers.

7. A parallel multiplier circuit as recited in claim 1, wherein said multiplier circuit further comprises:

a first scale down circuit, operatively connected to said first adder, to scale down the first variable; and a second scale down circuit, operatively connected to said first adder, to scale down the second variable, and wherein said first adder adds the first variable and the second variable as supplied by the first and second scale down circuits, respectively.

8. A parallel multiplier circuit as recited in claim 7, wherein said multiplier circuit further comprises:

a first scale up circuit, operatively connected to said second adder/subtractor, to scale up the first output; and a second scale up circuit, operatively connected to said third adder, to scale up the second output.

9. A parallel multiplier circuit as recited in claim 8, wherein no additional multipliers beyond said first, second and third multipliers are utilized to achieve the multiplication of the first and second complex numbers.

10. A parallel multiplier circuit as recited in claim 1, wherein said multiplier circuit includes a plurality of pipelined stages.

11. A parallel multiplier circuit as recited in claim 10, wherein said multiplier circuit includes three pipelined stages.

12. A parallel multiplier circuit as recited in claim 10, wherein said multiplier circuit further comprises:

a first register for temporary storage of the first coefficient;

a second register for temporary storage of the first variable;

a third register for temporary storage of the second variable;

a fourth register for temporary storage of the third coefficient;

a fifth register for temporary storage of the first sum;

a sixth register for temporary storage of the second coefficient;

a seventh register for temporary storage of the second multiplication result;

an eighth register for temporary storage of the first multiplication result;

a ninth register for temporary storage of the third multiplication result;

a tenth register for temporary storage of the first output; and an eleventh register for temporary storage of the second output.

13. A parallel multiplier circuit as recited in claim 12, wherein said multiplier circuit includes three pipelined stages, wherein said first through said sixth registers provide an interface between first and second stages, and wherein said seventh through said ninth registers provide an interface between second and third stages.

14. A parallel multiplier circuit as recited in claim 13, wherein no additional multipliers beyond said first, second and third multipliers are utilized to achieve the multiplication of the first and second complex numbers.

15. A parallel multiplier circuit for multiply a first complex number $(a+jb)$ by a second complex number $(x_0+jx_1)$ to produce a complex result $(Y_0+jy_0)$, said multiplier circuit receiving as inputs variables $x_0$ and $x_1$ and coefficients of A, B and C, where $A=a+b$, $B=b$, and $C=a-b$, said multiplier circuit comprising:

a first adder for adding $x_0$ and $x_1$ as a first sum $(x_0+x_1)$ a first multiplier for multiplying A with $x_0$ to produce a first multiplication result $(Ax_0)$;

a second multiplier for multiplying B with the first sum $(x_0+x_1)$ to produce a second multiplication result $B(x_0+x_1)$;

a third multiplier for multiplying C with $x_1$ to produce a third multiplication result $(Cx_1)$;

a second adder/subtractor for subtracting the second multiplication result from the first multiplication result to produce a real part $Y_0$ of the complex result; and a third adder for adding the third multiplication result with the second multiplication result to produce an imaginary part $y_1$ of the complex result;

whereby the complex result is produced in one clock cycle.

16. A parallel multiplier circuit as recited in claim 15, wherein only two of the coefficients A, B and C are supplied to said multiplier circuit and the second coefficient is not supplied to said multiplier circuit, and wherein the remaining coefficient is determined from the two of the coefficients that are supplied.

17. A parallel multiplier circuit as recited in claim 15, wherein only the coefficients A and C are supplied to said multiplier circuit and the coefficient B is not supplied to said multiplier circuit, and wherein said multiplier circuit further comprises a fourth adder/subtractor for subtracting the coefficient C from the coefficient A to determine the coefficient B.

18. A parallel multiplier circuit as recited in claim 1, wherein said parallel multiplier produces the multiplication result in a single clock cycle.

* * * * *

UNITED STATES PATENT AND TRADEMARK OFFICE
CERTIFICATE OF CORRECTION

PATENT NO. : 5,694,349
DATED : December 2, 1997
INVENTOR(S) : Debajyoti Pal

It is certified that error appears in the above-identified patent and that said Letters Patent is hereby corrected as shown below:

Column 1, line 67, change "mounts" to --amounts--.

Column 2, line 2, change "mounts" to --amounts--.

Column 2, line 20, change "fast" to --first--.

Column 8, line 38, change "failing" to --falling--.

IN THE CLAIMS:

Column 8, line 40, change "fast" to --first--.

Signed and Sealed this

Fifteenth Day of June, 1999

Attest:

Q. TODD DICKINSON

*Attesting Officer*     *Acting Commissioner of Patents and Trademarks*